United States Patent Office 3,130,049
Patented Apr. 21, 1964

3,130,049

PROCESS FOR PREPARING PRINTING PLATES COMPRISING NAPHTHOQUINONE DIAZIDES REPRODUCTION COATINGS

Wilhelm Neugebauer, Oskar Süs, Gerhard Fritz, and Fritz Uhlig, all of Wiesbaden-Biebrich, Germany, assignors, by mesne assignments, to Azoplate Corporation, Murray Hill, N.J.

No Drawing. Filed Apr. 13, 1960, Ser. No. 21,860
Claims priority, application Germany Apr. 16, 1959
43 Claims. (Cl. 96—33)

Printing plates the light-sensitive coatings of which contain naphthoquinone-(1,2)-diazide sulfonamides are known to the art.

Reproduction coatings, in particular for printing plates, have now been found which consist wholly or partially of one or more naphthoquinone-(1,2)-diazide sulfonic acid amides of aromatic amino-hydroxy compounds having at least one free hydroxyl group and which may be substituted, in which coatings the sulfonic acid amides may be present in association with alkali-soluble resins.

These light-sensitive sulfonic acid amides are in general prepared in known manner by the reaction of naphthoquinone-(1,2)-diazide-sulfonic acids, particularly in the form of their sulfonic acid chlorides, with a compound containing at least one hydroxyl group, at least one aromatic amino group and at least one aromatic nucleus, which may be substituted.

The naphthoquinone-(1,2)-diazide sulfonic acid amides of particular interest are those derived from naphthoquinone-(1,2)-diazide-(2)-sulfonic acid-(5) and from naphthoquinone-(1,2)-diazide-(2)-sulfonic acid-(4). Amides of other naphthoquinone-(1,2)-diazide-sulfonic acids such as naphthoquinone-(1,2)-diazide-(1)-sulfonic acid-(5),
naphthoquinone-(1,2)-diazide-(1)-sulfonic acid-(6),
naphthoquinone-(1,2)-diazide-(1)-sulfonic acid-(4),
naphthoquinone-(1,2)-diazide-(1)-sulfonic acid-(7) and
naphthoquinone-(1,2)-diazide-(1)-sulfonic acid-(8)

can, however, also be used.

Aromatic amino-hydroxy compounds of interest are those covered by the general formula $$(NH_2)_x—R—(OH)_y$$

in which both $x$ and $y$ are whole numbers of from 1–3 and R is an organic residue containing at least one aromatic nucleus which may be substituted by lower alkyl groups, such as methyl, ethyl, propyl, butyl and isobutyl, and in which the sum of $x$ and $y$ in one aromatic nucleus should not be greater than 3. Residues containing aromatic nuclei and corresponding to R that are of interest are: benzene, naphthalene, diphenyl, diphenyl-methane, triphenyl-methane, diphenyl-dimethyl-methane, diphenylene oxide, dinaphthyl, diphenyl-ether, chrysene, and phenanthrene. The following are examples of amino-hydroxy compounds containing aromatic nuclei:

3-hydroxy-aniline,
2-hydroxy-aniline,
2,5-dihydroxy-aniline,
7-hydroxy-naphthylamine-(2),
3-amino-4-hydroxy-diphenyl,
4-amino-2,5-dihydroxy-diphenyl,
4-amino-4′-hydroxy-diphenyl,
4,4′-diamino-2,2′-dihydroxy-diphenyl,
4,4′-diamino-2,2′-dihydroxy-5-5′-dimethyl-diphenyl-methane,
bis-(4,4′-dihydroxy-3,3′-diamino-diphenyl)-propane-(2,2), 4,4′-diamino-2″-hydroxy-triphenyl-methane,
4,4′-diamino-3″-hydroxy-triphenyl-methane,
4,4′-diamino-4″-hydroxy-triphenyl-methane,
1-amino-2-hydroxy-fluorene, and
2-amino-3-hydroxy-diphenyleneoxide.

The sulfonic acid amides according to the present invention thus have the general formula $$(D—SO_2—NH)_x—R—(OH)_y$$

D is a naphthoquinone-1,2-diazide residue and R, $x$ and $y$ are as indicated above.

Exemplary of such compounds are the following:

FORMULA 1

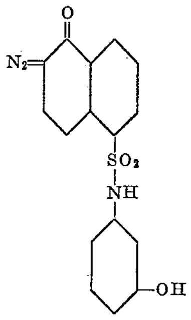

FORMULA 2

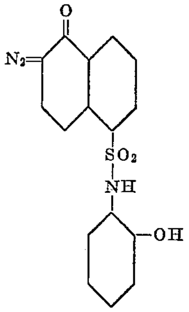

FORMULA 3

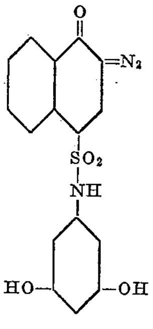

FORMULA 4

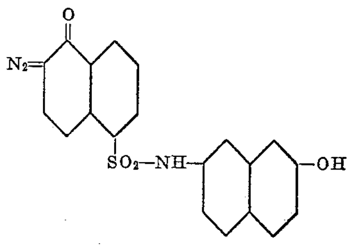

FORMULA 5
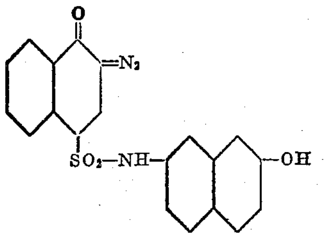
FORMULA 6
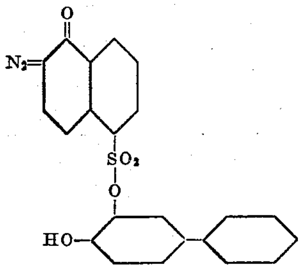
FORMULA 7
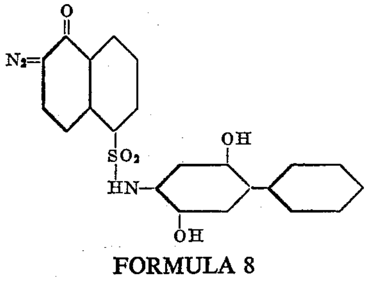
FORMULA 8
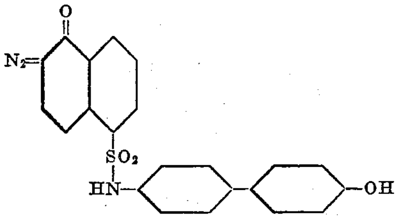
FORMULA 9
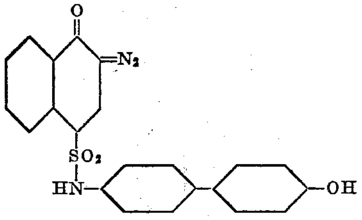
FORMULA 10
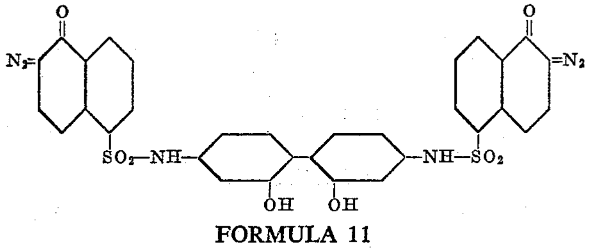
FORMULA 11
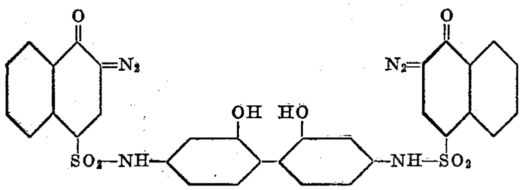
FORMULA 12
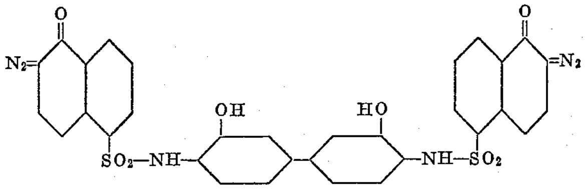
FORMULA 13
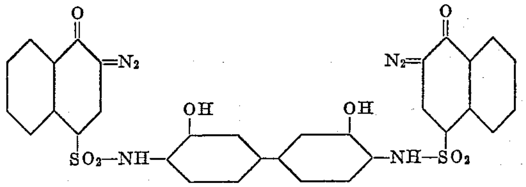
FORMULA 14
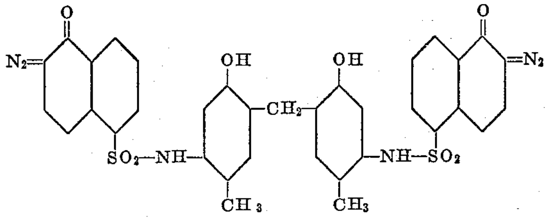
FORMULA 15
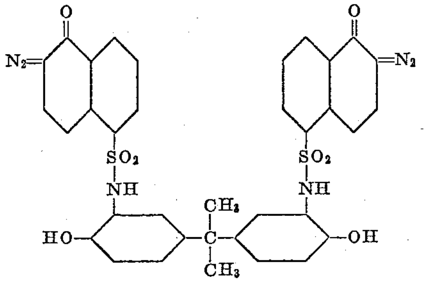
FORMULA 16
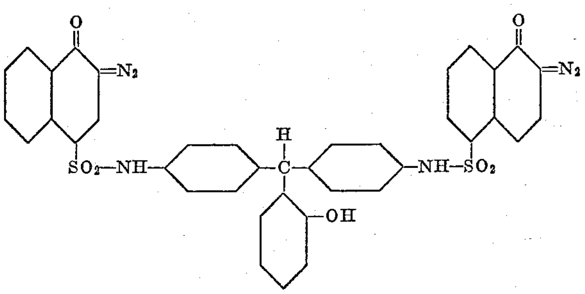
FORMULA 17
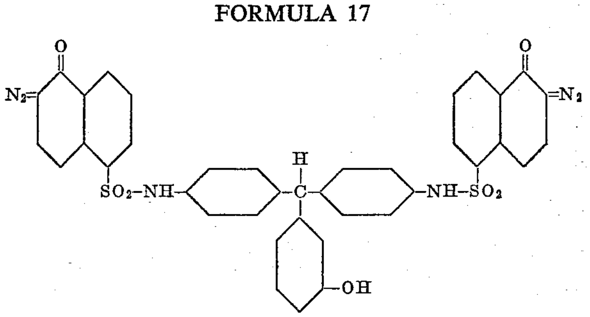

FORMULA 18

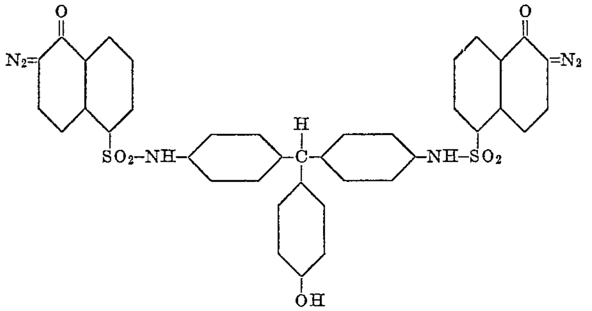

FORMULA 19

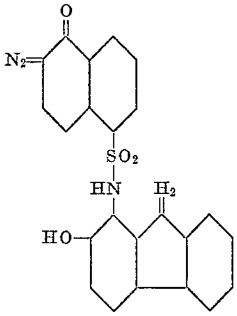

FORMULA 20

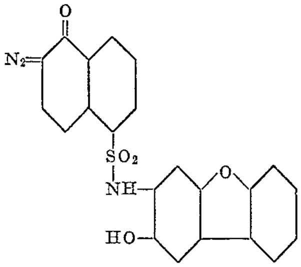

For the preparation of the sulfonic acid amides, the sulfonic acids, usually in the form of sulfonic acid chlorides, are generally dissolved in a solvent such as dioxane or tetrahydrofuran and an acid-binding agent is added thereto, e.g., alkali bicarbonates, alkali carbonates or other weak or very dilute alkalis or organic bases, in particular tertiary amines, e.g. pyridine and N-ethylpiperidine. The quantity of acid-binding agent added is only sufficient to make the reaction mixture neutral to slightly alkaline so that there will be no dyestuff formation. Also, to each amino group in the aminohydroxy compound about 1 mol or a slight excess of naphthoquinone-(1,2)-diazide sulfonic acid chloride is used. The reaction products that do not fall out in the course of the reaction are precipitated by adding water or introducing them into acidified water, filtered off and dried. The components may also be separately dissolved, and the solution of one component is then added to the solution of the other, with stirring, and the acid-binding agent is added either simultaneously or immediately afterwards. In special cases, the process may be performed without acid-binding agents; the method first mentioned, i.e., simultaneous solution of the components and addition of the acid-binding agent is, however, preferable. The sulfonic acid amides thus produced can generally be used immediately for the preparation of the light-sensitive reproduction coatings. They may, however, be purified by solution in a suitable solvent, e.g. dioxane, tetrahydrofuran, glacial acetic acid or dimethyl formamide and reprecipitated by the addition of water. The amino groups present may be caused to react without any considerable number of the hydroxyl groups being esterified, if appropriate quantities of the naphthoquinone-diazide sulfonic acid chlorides and corresponding quantities of acid binding agent are used.

For the preparation of the reproduction material, the naphthoquinone-(1,2)-diazide sulfonic acid amides containing hydroxyl groups are coated in known manner from solution in organic solvents, e.g. ethyleneglycol monomethylether, ethyleneglycol monoethylether, dioxane, dimethyl formamide or lower aliphatic ketones, upon supports, e.g. foils or plates made of metal, e.g. aluminum, zinc and copper or plates consisting of layers of several of such metals or of paper or glass. From this reproduction material, consisting of a support and a reproduction coating, printing plates are produced in known manner by exposure under a master followed by development, preferably with dilute alkalies, particularly salts with alkaline action such as trisodium phosphate and disodium phosphate, and the plates are then inked up with greasy ink.

In addition to the sulfonic acid amides, alkali-soluble resins can be included in the reproduction coatings, the homogeneity of the film-like coating on the support and the adherence of the image being generally increased thereby. Suitable alkali soluble resins of this kind may be natural resins such as shellac and colophony, synthetic resins such as interpolymers of styrene and maleic anhydride and, in particular, the lower phenol-formaldehyde condensation products known as novolaks.

Mixtures of several acid amides such as are described above may be used or the acid amides may be used in association with other light-sensitive substances.

In comparison with printing plates prepared with the sulfonic acid amides hitherto known, those prepared with naphthoquinone-(1,2)-diazide sulfonic acid amides with free hydroxyl groups, as described above, are characterized by greater ease of development. Moreover, these compounds are more readily dissolved in organic solvents so that in the preparation of the coating the formation of an even film on the coated material is facilitated and the occurrence of undesirable crystallization phenomena on the dried foil is avoided. The printing plates prepared by the above process will give a long printing run in an offset machine as a result of their great resistance to mechanical abrasion. The free hydroxyl groups apparently ensure good adhesion of the compounds on the support so that despite alkaline development, excellent differentiation between undecomposed diazo compounds and light-decomposition products is possible.

The invention will be further illustrated by reference to the following specific examples:

*Example 1*

1.5 parts by weight of the compound corresponding to Formula 1 are dissolved in 100 parts by volume of ethyleneglycol monomethylether and the solution is coated upon a mechanically roughened aluminum foil mounted on a rotating plate. The foil is dried by means of a hot air current and then further dried for about 2 minutes at 100° C. so that all remaining traces of solvent are removed. The foil thus sensitized is exposed under a master, e.g., to the light of an 18-amp. carbon arm lamp at a distance of 70 cm. for 1 minute. For the development of the latent image produced on the production coating, the exposed side of the foil is treated with a cotton wool pad soaked in about 5% disodium phosphate solution. The image appears in a bright yellow color on metal ground. The developed reproduction material is rinsed briefly with water, wiped over with about 1% phosphoric acid solution to increase the hydrophilic properties of the supporting material in the image-free parts, and then linked up with greasy ink. With the printing plate thus obtained, prints corresponding to the master can be prepared on a printing machine.

Equally good results are obtained with the compounds corresponding to Formulae 2, 3 and 5.

For the preparation of the diazo compound corresponding to Formula 1, 5.5 parts by weight of 3-aminophenol and 13.5 parts by weight of naphthoquinone-(1,2)-diazide-2-sulfonic acid chloride-(5) are dissolved together in 150 parts by volume of dioxane. Saturated sodium bicarbonate solution is then introduced dropwise into the solution at room temperature, with stirring, until the reaction mixture has a pH value of 8. The brown monosulfonic acid amide thereupon separates out in the form of a semi-solid product which solidifies when digested with 1000 parts by volume of ice water to which about 40 parts by volume of hydrochloric acid (1:1) have been added. If the 1-(naphthoquinone-(1,2)-diazide-(2)-sulfonamido-(5))-3-hydroxy-benzene thus obtained is recrystallized from dioxane, a light brown compound is obtained that melts with decomposition at 130°–132° C. The compound is readily soluble in dioxane, ethyl-methyl-ketone, ethyleneglycol monomethylether and acetic acid, but difficultly soluble in alkalies and ethanol.

For the preparation of the compound corresponding to Formula 2, 10.9 parts by weight of 2-amino-phenol and 29.0 parts by weight of naphthoquinone-(1,2)-diazide-(2)-sulfonic acid chloride-(5) are dissolved together in 300 parts by volume of dioxane. A 10% sodium bicarbonate solution is then added dropwise to the reaction mixture at room temperature, with stirring, until the mixture is neutral or, at most, weakly alkaline. For the completion of the reaction, stirring is continued for one hour. The crude sulfonic acid amide separates out in the form of a yellow-brown oil. It is washed a number of times with water, during which it sets to a solid yellow-brown substance. The compound is dissolved in dimethyl formamide and reprecipitated by the addition of water, the 2-(naphthoquinone - (1,2) - diazide - (2) - sulfonamido-(5))-1-hydroxy-benzene being then obtained as a non-melting substance which darkens and slowly decomposes at about 300° C. It is readily soluble in ethyleneglycol monomethylether and insoluble in alkalies.

For the preparation of the compound corresponding to Formula 3, 2.5 parts by weight of 1-amino-3,5-dihydroxy-benzene and 5.4 parts by weight of naphthoquinone -(1,2)-diazide-(2)-sulfonic acid chloride-(5) are dissolved in 100 parts by volume of dioxane. A saturated sodium bicarbonate solution is then introduced dropwise at room temperature, with stirring, until the solution is slightly alkaline. Stirring is continued for 20 minutes; the reaction mixture is then introduced into 1000 parts by volume of ice water acidified with 40 parts by volume of hydrochloric acid (1:1), whereupon the red-brown monosulfonic acid amide separates out. The compound is dissolved in ethyleneglycol monomethylether and reprecipitated with water, the brown 1-(naphthoquinone-(1,2) - diazide - (2) - sulfonamido-(5)-3,5-dihydroxy benzene being then obtained. When heated, the compound decomposes with darkening at about 330° C. It is soluble in dioxane, ethyleneglycol monomethylether, ethylmethyl-ketone and alkalies and sparingly soluble in acetic acid and ethanol.

For the preparation of the compound corresponding to Formula 5, 15.9 parts by weight of 2-amino-naphthol-(7) and 26.8 parts by weight of naphthoquinone-(1,2)-diazide-(2)-sulfonic acid chloride-(4) are dissolved in 300 parts by volume of dioxane and the reaction is effected by the addition of saturated sodium bicarbonate solution in the manner described for the preparation of the compound corresponding to Formula 3. The 2-(naphthoquinone - (1,2) - diazide-(2)-sulfonamido-(4))-7-hydroxy-naphthalene is obtained. It decomposes with slow darkening when heated to over 200° C. The compound is readily soluble in dioxane, ethyl-methyl-ketone, ethyleneglycol monomethylether and acetic acid and sparingly soluble in ethanol.

*Example 2*

1.5 parts by weight of the compound corresponding to Formula 6 and 3.5 parts by weight of a phenol-formaldehyde novolak ("Alnovol") are dissolved in 100 parts by volume of ethyleneglycol monomethylether and this solution is coated upon a mechanically roughened aluminum foil. It is dried in a hot air current and the reproduction material thus produced is exposed under a master to the light of an 18-amp. arc lamp at a distance of about 70 cm. The material is developed by treatment with a 5% aqueous trisodium phosphate solution which also contains about 15% of ethyleneglycol monomethylether. After a brief rinsing with water and treatment with a 1% (approx.) aqueous phosphoric acid solution, the plate is inked up with greasy printing ink. With the printing plate thus obtained prints corresponding to the master can be prepared on a printing machine.

Equally good results are obtained with the compounds corresponding to Formulae 7, 8, 9 and 12.

For the preparation of the compound corresponding to Formula 6, 9.25 parts by weight of 3-amino-4-hydroxy-diphenyl are dissolved in 200 parts by volume of dioxane and 13.5 parts by weight of naphthoquinone-(1,2)-diazide-(2)-sulfonic acid chloride-(5) in 100 parts by volume of dioxane; the two solutions are mixed. Into this reaction mixture, 4 parts by volume of pyridine are introduced dropwise at room temperature, with stirring, and stirring is continued for about 1 hour. The crude product is precipitated out in the form of a yellow-brown mass by the addition of 500 parts by volume of water. The 3-(naphthoquinone-(1,2)-diazide-sulfonamido-(5))-4-hydroxy-diphenyl is purified by solution in glacial acetic acid and reprecipitated by the addition of water. The product thus obtained melts at 135°–140° C. with decomposition and is readily soluble in ethyleneglycol monomethylether.

For the preparation of the compound corresponding to Formula 7, 6.5 parts by weight of 4-amino-2,5-dihydroxydiphenyl are dissolved in 60 parts by volume of dioxane and 8.1 parts by weight of naphthoquinone-(1,2)-diazide-(2)-sulfonic acid chloride-(5) in 60 parts by volume of dioxane; the two solutions are mixed. Into this reaction mixture 2.5 parts by volume of pyridine are introduced dropwise at room temperature, with stirring, and stirring is continued for about one hour. After the reaction product has been precipitated with water, the 4-(naphthoquinone-(1,2)-diazide - (2) - sulfonamido-(5))-2,5-dihydroxydiphenyl is dissolved in glacial acetic acid and reprecipitated by the addition of water. It is obtained in the form of a yellow-brown compound that melts with decomposition at 115° C. The compound is readily soluble in ethyleneglycol monomethylether.

For the preparation of the compound corresponding to Formula 9, 5.55 parts by weight of 4-amino-4′-hydroxy-diphenyl are dissolved in 150 parts by volume of dioxane and 8.1 parts by weight of naphthoquinone-(1,2)-diazide-(2)-sulfonic acid chloride-(4) in 70 parts by volume of dioxane; the two solutions are mixed. 2.5 parts by volume of pyridine are introduced into this mixture dropwise at room temperature, with stirring, and stirring is continued for about one hour. The reaction product is precipitated by the addition of 300 parts by volume of water. The yellow-brown 4-(naphthoquinone-(1,2)-diazide-(2)-sulfonamido-(4))-4′-hydroxy-diphenyl is purified by solution in dioxane and reprecipitated with water. The product melts at about 215° C. with decomposition and is readily soluble in ethylene-glycol monomethylether.

The compound corresponding to Formula 8 is prepared in a manner exactly analogous to that used for the compound corresponding to Formula 9, the same quantity of naphthoquinone-(1,2)-diazide-(2)-sulfonic acid chloride-(5) being used instead of the naphthoquinone(1,2)-diazide-(2)-sulfonic acid chloride-(4).

For the preparation of the compound corresponding to Formula 12, 1.1 parts by weight of 4,4′-diamino-3,3′-dihydroxy-diphenyl and 2.7 parts by weight of naphthoquinone-(1,2)-diazide-(2)-sulfonic acid chloride-(5) are in each case dissolved in 30 parts by volume of dioxane and the two solutions are mixed. 7% sodium carbonate solution is then introduced dropwise at room temperature, with stirring, until the mixture is neutral or at most weakly alkaline; stirring is then continued for one hour. The crude product is precipitated out by the addition of 100 parts by volume of water; it is dissolved in dioxane and reprecipitated by the addition of ethanol. Thus purified, the 4,4′-bis-(naphthoquinone-(1,2)-diazide-(2)-sulfonamido-(5))-3,3′-dihydroxy-diphenyl is in the form of a yellow substance which melts at 135° C. with decomposition. It is readily soluble in ethyleneglycol monomethylether.

*Example 3*

A pretreated paper foil (USP 2,534,588) is coated with a 1.5% solution of the compound corresponding to Formula 10 in ethyleneglycol monomethylether, dried in a hot air current and then exposed to light under a master for one minute in the manner described in Example 1 and developed by treatment with a 0.2–0.5% trisodium phosphate solution. Once the material has been inked up with greasy ink, a printing plate is obtained from which prints corresponding to the master can be made in a printing machine.

For the preparation of the compound corresponding to Formula 10, 1.45 parts by weight of 4,4′-diamino-2,2′-dihydroxy-diphenyl-dihydrochloride are dissolved in 50 parts by volume of dimethyl formamide and 2.7 parts by weight of naphthoquinone-(1,2)-diazide-(2)-sulfonic acid chloride-(5) in 30 parts by volume of dioxane; the two solutions are mixed. A 6% sodium carbonate solution is then introduced dropwise at room temperature, with stirring, until the mixture is neutral or at most weakly alkaline; stirring is continued for about one hour. The crude product is precipitated out by the addition of water. For purification, the yellow brown 4,4′-bis-(naphthoquinone-(1,2)-diazide-(2)-sulfonamido-(5))-2,2′-dihydroxy-diphenyl is dissolved in sodium carbonate solution. The solution is filtered and the product is reprecipitated with acetic acid. It is readily soluble in ethyleneglycol monomethylether and melts with decomposition at 125° C.

*Example 4*

A degreased zinc plate is coated with a solution consisting of 4 parts by weight of the compound corresponding to Formula 4 and 3 parts by weight of the phenolformaldehyde novolak described in Example 2, in 100 parts by volume of ethyleneglycol monomethylether; it is then dried. The material thus prepared is exposed for about 5 minutes under a master in the manner described in Example 1. For development, a 5% (approx.) trisodium phosphate solution, also containing about 15% of ethyleneglycol monomethylether is used. From the plate thus obtained a printing block is prepared by etching with a 4% (approx.) nitric acid solution. This can be used for relief printing processes; the printing plates obtained correspond to the master.

For the preparation of the compound corresponding to Formula 4, 15.9 parts by weight of 2-amino-naphthol-(7) and 26.8 parts by weight of naphthoquinone-(1,2)-diazide-(2)-sulfonic acid chloride-(5) are dissolved in 300 parts by volume of dioxane. A saturated sodium carbonate solution is introduced dropwise at room temperature, with stirring, until the reaction mixture is neutral; stirring is continued for about 30 minutes. The reaction mixture is introduced into 1000 parts by volume of ice water where it is digested, the brown sulfonic acid amide thereupon separating out. It is purified by solution in dioxane and the 2-(naphthoquinone-(1,2)-diazide-(2)-sulfonamido-(5))-7-hydroxy-naphthalene is precipitated by the addition of water. The compound decomposes with slow darkening when heated to over 330° C. It is readily soluble in dioxane, acetic acid and ethyleneglycol monomethylether, sparingly soluble in ethyl-methyl-ketone and insoluble in methanol.

*Example 5*

Four parts by weight of the compound corresponding to Formula 15 and 3 parts by weight of the phenolformaldehyde novolak mentioned above and a 0.5 part by weight of Methyl Violet (Schultz' "Farbstofftabellen," vol. I, 7th edition, 1931, p. 327, No. 783) are dissolved in 92.5 parts by volume of ethyleneglycol monomethylether and this solution is coated upon a bimetal plate, e.g., made of aluminum and copper, and dried. The coated plate is exposed to light under a master in the manner described in Example 1, and developed with a 5% trisodium phosphate solution containing 15% of ethyleneglycol monomethylether. The plate is treated for 60 to 90 seconds with a solution of 160 parts by weight of iron-III-nitrate ($9H_2O$) in 100 parts by volume of water and a printing plate corresponding to the master is thus obtained.

For the preparation of the compound corresponding to Formula 15, 10 parts by weight of 3,3′-diamino-(4,4′)-dihydroxy-diphenyl-propane-(2,2) and 22.5 parts by weight of naphthoquinone-(1,2)-diazide-(2)-sulfonic acid chloride-(5) are dissolved in 200 parts by volume of dioxane. 5% sodium carbonate solution is then introduced dropwise at room temperautre, with stirring, until the reaction mixture is neutral or at the most weakly alkaline, and stirring is continued for one hour. The crude product separates out in the form of a green-brown oil which, after being washed a number of times with water, sets to a solid yellow-green substance. It is purified by solution in a dioxane and methanol mixture and reprecipitated with water. The 3,3′-bis-(naphthoquinone-(1,2)-diazide-(2)-sulfonamido - (5)) - 4,4′ - dihydroxy - diphenyl - propane-(2,2) decomposes with slow darkening when heated to 360° C. The product is readily soluble in ethyleneglycol monomethylether and insoluble in alkalies.

*Example 6*

Four parts by weight of the compound corresponding to Formula 11 and 3 parts by weight of the phenolformaldehyde novolak mentioned in Example 2, and a 0.5 part by weight of Methyl Violet are dissolved in 92.5 parts by volume of ethyleneglycol monomethylether. This solution is coated upon a lithographic trimetal plate made of aluminum, copper and chromium and the plate is dried. In the manner described in Example 1, the plate is exposed to light under a master, developed with a 5% trisodium phosphate solution containing in addition 15% of ethyleneglycol monomethylether and then etched for 8–10 minutes with a solution consisting of 500 parts by weight of calcium chloride, 250 parts by volume of water, 80 parts by volume of concentrated hydrochloric acid and 80 parts by volume of glycerine (U.S. Patent 2,687,345). In this way, a printing plate is obtained which is a negative of the master.

For the preparation of the compound corresponding to Formula 11, 5.7 parts by weight of 4,4′-diamino-2,2′dihydroxy-diphenyl-dihydrochloride are dissolved in a mixture of 100 parts by volume of dioxane and 100 parts by volume of dimethyl formamide and this solution is mixed with a solution of 10.8 parts by weight of naphthoquinone-(1,2)-diazide-(2)-sulfonic acid chloride-(4) in 50 parts by volume of dioxane. An 8% sodium bicarbonate solution is then introduced dropwise at room temperature, with stirring, until the mixture is neutral or weakly alkaline; stirring is continued for one hour. The crude product is precipitated in the form of a yellow-brown compound by the addition of 500 parts by volume of water. It is purified by solution in dioxane and reprecipitated with water. The 4,4′-bis-(naphthoquinone-(1,2)-diazide-(2) - sulfonamido - (4)) - 2,2′ - dihydroxy - diphenyl melts with decomposition at 150° C. and is readily soluble in ethyleneglycol monomethylether.

*Example 7*

A superficially roughened aluminum foil is coated with a solution containing 1.5 parts by weight of the compound corresponding to Formula 14, and 3.5 parts by weight of a phenol-formaldehyde novolak in 100 parts by volume of ethyleneglycol monomethylether, and a printing plate corresponding to the master is prepared therewith in the manner described in Example 2.

In the same way, printing plates corresponding to the master and giving good printing results can be prepared with the compound corresponding to Formula 16 (dissolved in dioxane), the one corresponding to Formula 17 (dissolved in dimethyl formamide) or that corresponding to Formula 18 (dissolved in diacetone alcohol).

For the preparation of the compound corresponding to Formula 14, 25.8 parts by weight of 4,4'-diamino-2,2'-dihydroxy-5,5'-dimethyl-diphenyl methane and 58 parts by weight of naphthoquinone-(1,2)-diazide-(2)-sulfonic acid chloride-(5) are dissolved in a mixture of 200 parts by volume of dioxane and 50 parts by volume of dimethyl formamide. A 10% sodium bicarbonate solution is then introduced dropwise at room temperature, with stirring, until the mixture is neutral or at most weakly alkaline; stirring is continued for about one hour. The crude product separates out in the form of a yellow-brown oil which can be converted into a solid yellow-brown substance by repeated washing with water. Solution in dioxane, followed by reprecipitation with water finally gives the 4,4'-bis - (naphthoquinone - (1,2)-diazide-(2)-sulphonamido-(5)) - 2,2' - dihydroxy - 5,5'-dimethyl-diphenyl methane which begins to decompose slowly with darkening at about 360° C. The compound is readily soluble in ethyleneglycol monomethylether and insoluble in alkalies.

For the preparation of the compound corresponding to Formula 16, 29 parts by weight of 4,4'-diamino-2''-hydroxy-triphenyl-methane and 56 parts by weight of naphthoquinone-(1,2)-diazide-(2)-sulfonic acid chloride-(5) are dissolved with heating in a mixture of 200 parts by volume of dioxane and 50 parts by volume of dimethyl formamide. After the mixture has cooled, a 10% sodium bicarbonate solution is introduced dropwise at room temperature, with stirring, until the mixture is neutral or at most weakly alkaline; stirring is continued for about one hour. The reaction product which then separates out in the form of a yellow-brown oil sets to a yellow solid after repeated washings with water. It is purified by solution in a mixture of dioxane and methanol and reprecipitated with water. The 4,4' - bis - (naphthoquinone-(1,2) - diazide - (2) - sulfonamide - (5)) - 2'' - hydroxy-triphenyl-methane decomposes with darkening when heated to about 360° C. It is readily soluble in ethyleneglycol monomethylether and insoluble in alkalies.

For the preparation of the compound corresponding to Formula 17, 29 parts by weight of 4,4'-diamino-3''-hydroxy-triphenyl-methane and 56 parts by weight of naphthoquinone-(1,2)-diazide-(2)-sulfonic acid chloride-(5) are dissolved, with heating, in a mixture of 200 parts by volume of dioxane and 50 parts by volume of dimethyl formamide. After the solution has cooled, a 10% sodium bicarbonate solution is introduced dropwise, at room temperature, with stirring, until the mixture is neutral or at most weakly alkaline; stirring is then continued for about one hour. The yellow-brown oil which separates out solidifies, after repeated washings with water, to a yellow substance. This substance is dissolved in a mixture of dioxane and methanol and reprecipitated by the addition of water. The 4,4'-bis-(naphthoquinone-(1,2)-diazide - (2) - sulfonamido-(5))-3''-hydroxy-triphenyl-methane slowly becomes dark in color and decomposes when heated to over 360° C. It is readily soluble in ethyleneglycol monomethylether and insoluble in alkalies.

For the preparation of the compound corresponding to Formula 18, 29 parts by weight of 4,4'-diamino-4''-hydroxy-triphenyl-methane and 56 parts by weight of naphthoquinone-(1,2)-diazide-(2)-sulfonic acid chloride-(5) are dissolved, with heating, in a mixture of 200 parts by volume of dioxane and 50 parts by volume of dimethyl formamide. After cooling, a 10% sodium bicarbonate solution is introduced dropwise into the reaction mixture at room temperature, with stirring, until the mixture is neutral or at most weakly alkaline; stirring is then continued for about one hour. The crude product, which separates out in the form of a yellow-brown oil, solidifies to a yellow substance after repeated washings with water. For further purification, it is twice digested with hot methanol. The 4,4' - bis-(naphthoquinone-(1,2)-diazide-(2)-sulfonamido-(5))-4''-hydroxy-triphenyl-methane decomposes slowly with darkening when heated to over 360° C. It is readily soluble in ethyleneglycol monomethylether and insoluble in alkalies.

*Example 8*

An anodically oxidized aluminum foil is coated with a solution of 1.5 parts by weight of the compound corresponding to Formula 13 dissolved in 100 parts by volume of a mixture of equal parts of dimethyl formamide and ethyleneglycol monomethylether and dried. It is exposed to light under a master, developed with an aqueous 1% disodium phosphate solution, rinsed with water, treated with 1% phosphoric acid, so that its hydrophilic properties are increased, and inked up with greasy ink. In this way, printing plates are obtained from which prints corresponding to the master can be prepared in a printing machine.

For the preparation of the compound corresponding to Formula 13, 2.16 parts by weight of 4,4'-diamino-3,3'-dihydroxy-diphenyl are dissolved in 100 parts by volume of dioxane and the solution is mixed with a solution of 5.4 parts by weight of naphthoquinone-(1,2)-diazide-(2)-sulfonic acid chloride-(4) in 50 parts by volume of dioxane. 4 parts by volume of pyridine are then introduced dropwise into this reaction mixture at room temperature, with stirring, after which stirring is continued for about one hour. The crude product is precipitated out by the addition of 300 pats by volume of water; it is then dissolved in dioxane and the 4,4'-bis-(naphthoquinone - (1,2) - diazide - (2) - sulfonamido - (4)) - 3,3'-dihydroxy-diphenyl is precipitated in the form of a yellow-brown compound which melts, with decomposition, at 140° C. It is readily soluble in ethyleneglycol monomethylether.

*Example 9*

By the method described in Example 1, a mechanically roughened aluminum foil is coated with the compound corresponding to Formula 19 dissolved in ethyleneglycol monomethylether. For development, a 10% disodium phosphate solution is used. After the plate has been inked up with greasy ink, printing plates corresponding to the master are obtained. In the same manner, the compound corresponding to Formula 20 can be used for the preparation of printing plates.

For the preparation of the compound corresponding to Formula 19, 5.55 parts by weight of 1-amino-2-hydroxy-fluorene are dissolved in 50 parts by volume of dioxane and a solution of 6.75 parts by weight of naphthoquinone-(1,2)-diazide-(2)-sulfonic acid chloride-(5) dissolved in 50 parts by volume of dioxane is added thereto. 2 parts by volume of pyridine are introduced dropwise into this reaction mixture at room temperature, with stirring, after which stirring is continued for one hour. The cude product is precipitated out by the addition of 200 parts by volume of water and the yellow compound is purified by solution in dioxane and reprecipitated with water. The 1 - (naphthoquinone - (1,2) - diazide - (2) - sulfonamido-(5))-2-hydroxyfluorene begins to melt, with decomposition, at 160° C. It is readily soluble in ethyleneglycol monomethylether.

For the preparation of the compound corresponding to Formula 20, 9.4 parts by weight of 2-amino-3-hydroxy-diphenylene oxide are dissolved in 180 parts by volume of dioxane and 10.8 parts by weight of naphthoquinone-(1,2)-diazide-(2)-sulfonic acid chloride-(5) in 80 parts by volume of dioxane. After the two solutions have been mixed 6.4 parts by volume of pyridine are introduced dropwise at room temperature, with stirring, after which stirring is continued for about one hour. The crude product is precipitated out by the addition of 400 parts by volume of water. For purification, it is dissolved in sodium carbonate solution and reprecipitated with acetic acid. The 2-(naphthoquinone-(1,2)-diazide-(2)-sulfonamido-(5))-3-hydroxy-diphenylene oxide begins to melt with decomposition at 160° C. and is readily soluble in ethyleneglycol monomethylether.

*Example 10*

Two parts by weight of 2-(naphthoquinone-(1,2)-diazide - (2) - sulfonamido - (5)) - (7) - hydroxy -naphthalene, corresponding to Formula 4, and 6 parts by weight of a light-colored m-cresol-formaldehyde resin novolak, having the softening point 108–118° C., are dissolved in 100 parts by volume of ethyleneglycol monomethylether. 0.3 part by weight of castor oil and 0.5 part by weight of Methyl Violet BB are added. The solution is filtered and then coated onto a polished zinc plate; the layer is then dried by means of warm air. For the preparation of a block, the layer side of the zinc plate is exposed through a diapositive; the exposed layer side which now carries the latent image is treated with a cotton pad soaked with an about 2.0% trisodium phosphate solution containing also 10–15% (by vol.) of ethyleneglycol monomethylether. The parts of the layer which are struck by light are removed from the surface of the zinc plate, and an image corresponding to the master used remains on the metallic base material. After rinsing with water, the plate is placed with its layer side on an earthenware trough provided with vaned wheels which centrifuge dilute (7–8%) nitric acid against the plate. Etching is performed either by the usual process in several steps or according to the one-step etching process. Without heating the zinc plate before etching, there is obtained a printing plate which is particularly suitable for book and illustration printing.

*Example 11*

In 100 parts by volume of ethyleneglycol monomethylether there are dissolved 2 parts by weight of 4-(naphthoquinone - (1,2) - diazide-(2)-sulfonamide-(4))-(4′)-hydroxy-diphenyl, corresponding to Formula 9, and 6 parts by weight of the m-cresol-formaldehyde resin novolak described in Example 10, 0.3 part by weight of maize oil, and 0.5 part by weight of rosaniline hydrochloride are added. The solution is then filtered and coated onto a polished copper plate. After exposure under a photographic negative, the layer is treated with a cotton pad soaked with an about 2.5% trisodium phosphate solution containing also 10–15% (by vol.) of ethyleneglycol monomethylether. By this treatment, the light-struck parts of the layer are removed from the metallic carrier. The copper plate carrying a layer, parts of which are removed corresponding to the master, is now etched at 20–22° C. with an iron chloride solution of 40° Bé. The light-sensitive solution is also suitable for directly coating rotating copper cylinders, one or more spray nozzles being used.

It will be obvious to those skilled in the art that many modifications may be made within the scope of the present invention without departing from the spirit thereof, and the invention includes all such modifications.

What is claimed is:

1. A compound having the formula $$D-SO_2-\overset{H}{N}-R-OH$$

in which D is a naphthoquinone-(1,2)-diazide radical and R is a non-oxo arylene group in which the NH group is linked to the OH group through a linkage consisting of carbon atoms.

2. A compound having the formula

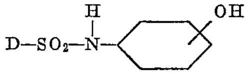

in which D is a naphthoquinone-(1,2)-diazide radical.

3. A compound having the formula

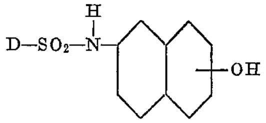

in which D is a naphthoquinone-(1,2)-diazide radical.

4. A compound having the formula

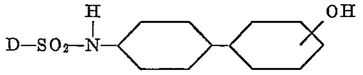

in which D is a naphthoquinone-(1,2)-diazide radical.

5. A compound having the formula

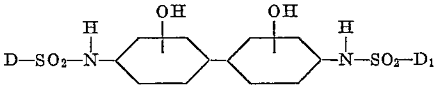

in which D and $D_1$ are naphthoquinone-(1,2)-diazide radicals.

6. A compound having the formula

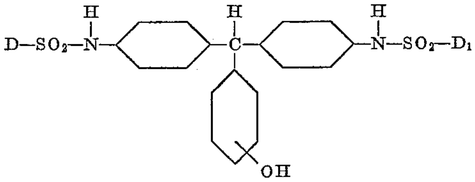

in which D and $D_1$ are naphthoquinone-(1,2)-diazide radicals.

7. A compound having the formula

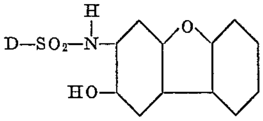

in which D is a naphthoquinone-(1,2)-diazide radical.

8. A presensitized printing plate comprising a base material having a coating thereon, the coating comprising a compound having the formula $$D-SO_2-\overset{H}{N}-R-OH$$

in which D is a naphthoquinone-(1,2)-diazide radical and R is a non-oxo arylene group in which the NH group is linked to the OH group through a linkage consisting of carbon atoms.

9. A presensitized printing plate according to claim 8 in which the coating contains an alkali-soluble resin.

10. A presensitized printing plate comprising a base material having a coating thereon, the coating comprising a compound having the formula

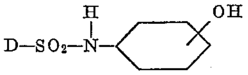

in which D is a naphthoquinone-(1,2)-diazide radical.

11. A presensitized printing plate comprising a base material having a coating thereon, the coating comprising a compound having the formula

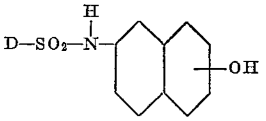

in which D is a naphthoquinone-(1,2)-diazide radical.

12. A presensitized printing plate comprising a base material having a coating thereon, the coating comprising a compound having the formula

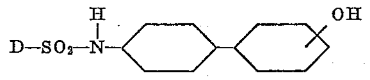

in which D is a naphthoquinone-(1,2)-diazide radical.

13. A presensitized printing plate comprising a base material having a coating thereon, the coating comprising a compound having the formula

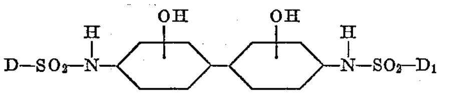

in which D and $D_1$ are naphthoquinone-(1,2)-diazide radicals.

14. A presensitized printing plate comprising a base material having a coating thereon, the coating comprising a compound having the formula

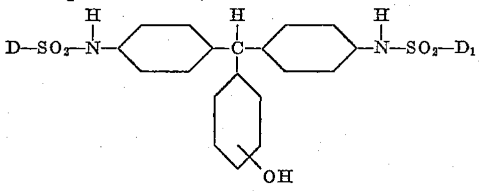

in which D and $D_1$ are naphthoquinone-(1,2)-diazide radicals.

15. A presensitized printing plate comprising a base material having a coating thereon, the coating comprising a compound having the formula

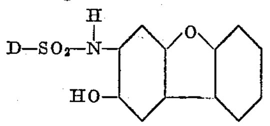

in which D is a naphthoquinone-(1,2)-diazide radical.

16. A process for making a printing plate which comprises exposing a coated base material to light under a master, the coating comprising a compound having the formula $$D{-}SO_2{-}\overset{H}{\overset{|}{N}}{-}R{-}OH$$

in which D is a naphthoquinone-(1,2)-diazide radical and R is a non-oxo arylene group in which the NH group is linked to the OH group through a linkage consisting of carbon atoms, and treating the exposed coating with a dilute alkali developing solution.

17. A process according to claim 16 in which the coating contains an alkali-soluble resin.

18. A process for making a printing plate which comprises exposing a coated base material to light under a master, the coating comprising a compound having the formula

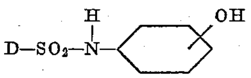

in which D is a naphthoquinone-(1,2)-diazide radical, and treating the exposed coating with a dilute alkali developing solution.

19. A process for making a printing plate which comprises exposing a coated base material to light under a master, the coating comprising a compound having the formula

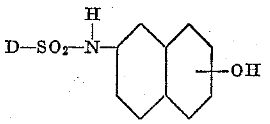

in which D is a naphthoquinone-(1,2)-diazide radical, and treating the exposed coating with a dilute alkali developing solution.

20. Aprocess for making a printing plate which comprises exposing a coated base material to light under a master, the coating comprising a compound having the formula

in which D is a naphthoquinone-(1,2)-diazide radical, and treating the exposed coating with a dilute alkali developing solution.

21. A process for making a printing plate which comprises exposing a coated base material to light under a master, the coating comprising a compound having the formula

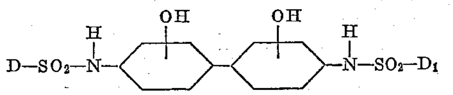

in which D and $D_1$ are naphthoquinone-(1,2)-diazide radicals, and treating the exposed coating with a dilute alkali developing solution.

22. A process for making a printing plate which comprises exposing a coated base material to light under a master, the coating comprising a compound having the formula

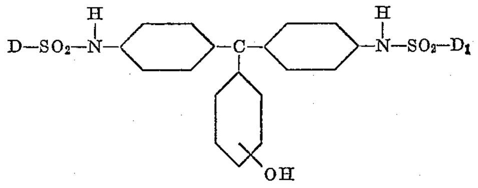

in which D and $D_1$ are naphthoquinone-(1,2)-diazide radicals, and treating the exposed coating with a dilute alkali developing solution.

23. A process for making a printing plate which comprises exposing a coated base material to light under a master, the coating comprising a compound having the formula

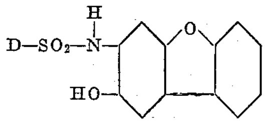

in which D is a naphthoquinone-(1,2)-diazide radical, and treating the exposed coating with a dilute alkali developing solution.

24. A compound having the formula

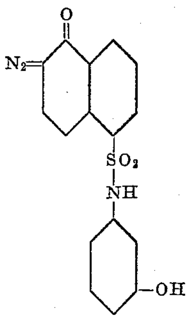

25. A compound having the formula

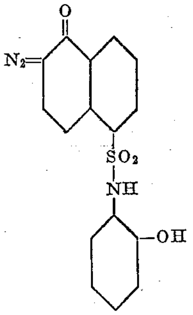

26. A compound having the formula

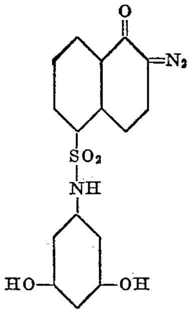

27. A compound having the formula

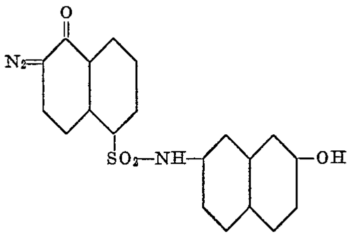

28. A compound having the formula

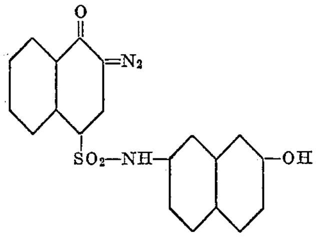

29. A compound having the formula

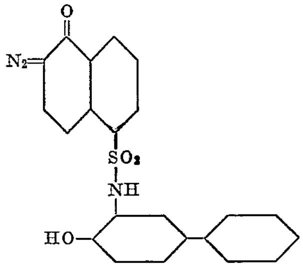

30. A compound having the formula

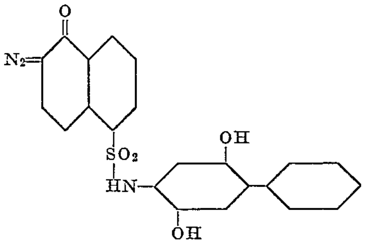

31. A compound having the formula

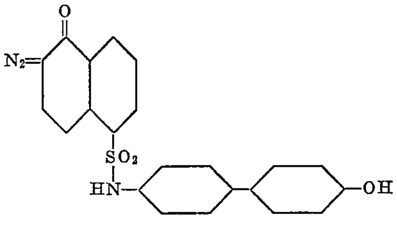

32. A compound having the formula

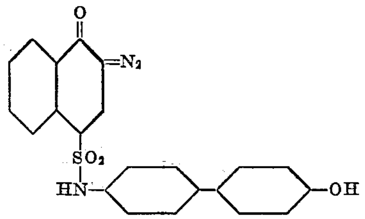

33. A compound having the formula

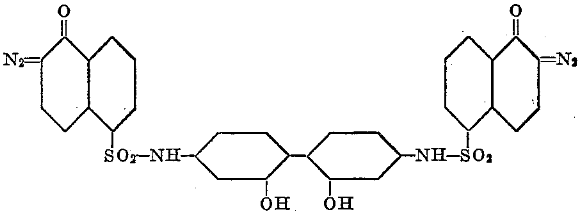

34. A compound having the formula

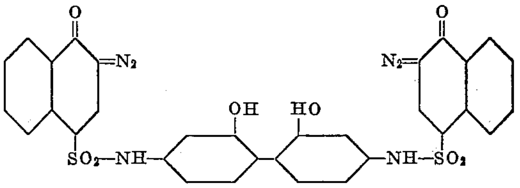

35. A compound having the formula

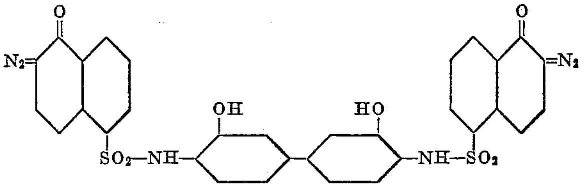

36. A compound having the formula

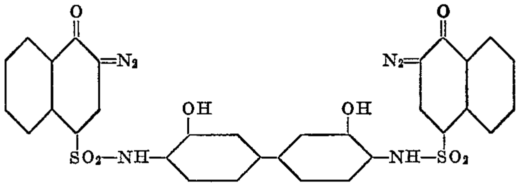

37. A compound having the formula

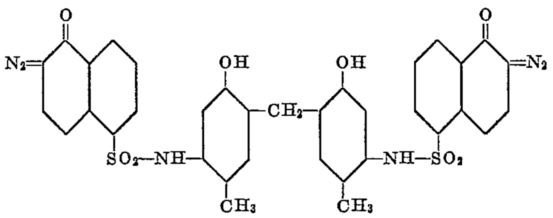

38. A compound having the formula

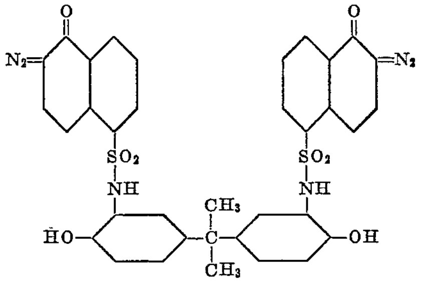

39. A compound having the formula
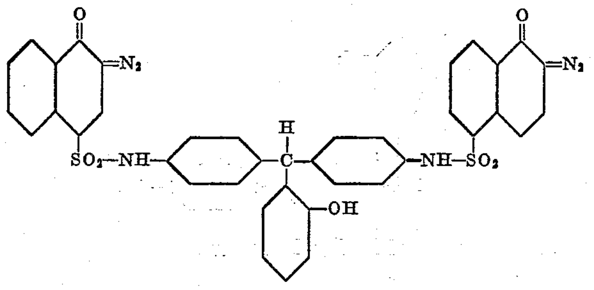
40. A compound having the formula
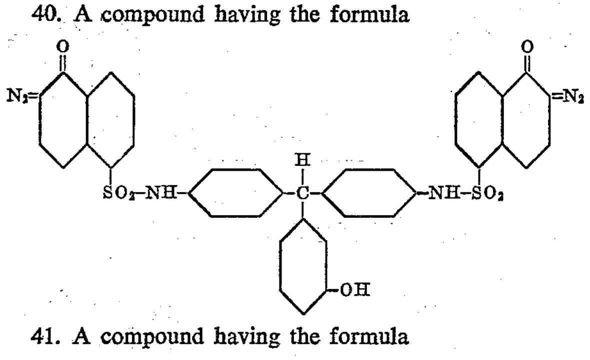
41. A compound having the formula
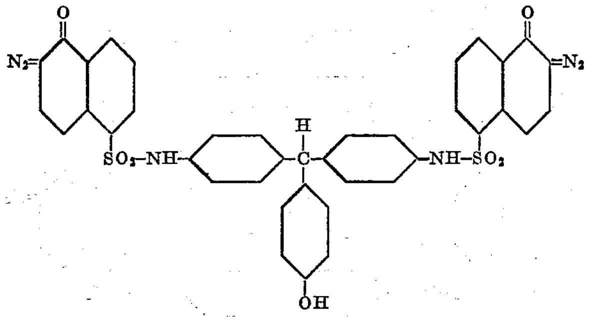
42. A compound having the formula
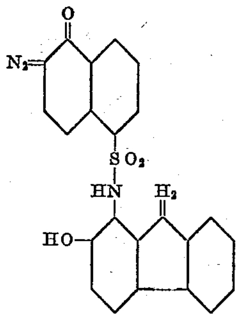
43. A compound having the formula
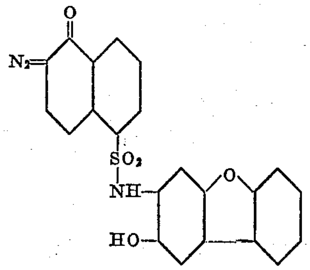
References Cited in the file of this patent
UNITED STATES PATENTS
| | | |
|---|---|---|
| 2,514,234 | Gasper | July 4, 1950 |
FOREIGN PATENTS
| | | |
|---|---|---|
| 706,028 | Great Britain | Mar. 24, 1954 |
| 706,879 | Great Britain | Apr. 7, 1954 |
| 729,746 | Great Britain | May 11, 1955 |
| 732,544 | Great Britain | June 29, 1955 |
| 737,379 | Great Britain | Sept. 28, 1955 |
| 739,654 | Great Britain | Nov. 2, 1955 |